United States Statutory Invention Registration [19]

Miller

[11] Reg. Number: H336

[43] Published: Oct. 6, 1987

[54] NON-DESTRUCTIVE METHOD TO ASSESS PHYSICAL CONDITION OF CHEMICAL FILL

[75] Inventor: Miles C. Miller, Joppatowne, Md.

[73] Assignee: The United States of America as represented by the Secretary of the Army, Washington, D.C.

[21] Appl. No.: 937,802

[22] Filed: Dec. 4, 1986

[51] Int. Cl.[4] ..... G01N 9/04; G01N 11/16

[52] U.S. Cl. ..... 73/579; 73/32 A; 73/54

*Primary Examiner*—Stephen C. Buczinski
*Assistant Examiner*—Linda J. Wallace
*Attorney, Agent, or Firm*—Anthony T. Lane; Harold H. Card, Jr.; Michael C. Sachs

[57] ABSTRACT

This invention relates to a method for assessment of the condition, and change of condition, of the liquid fill for chemical projectiles by analyzing the vibrational characteristics of the projectile and fill. It is a method by which the condition of the liquid fill in a projectile can be assessed without requiring cutting, drilling, and/or altering the structure of the shell or payload. This non-destructive technique can be used with projectiles filled with toxic or hazardous materials and can occur within the confines of storage buildings. The system for incorporating the method of the invention includes a projectile which is freely suspended and then struck with a device causing the projectile and the fill to vibrate. The natural vibrational characteristics of the projectile and fill are measured and recorded and can be compared to model data to ascertain any changes in the physical characteristics of the fill.

3 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

NON-DESTRUCTIVE METHOD TO ASSESS PHYSICAL CONDITION OF CHEMICAL FILL

GOVERNMENT INTEREST

The invention described herein may be manufactured used and licensed by or for the Government for Governmental purposes without the payment to me of any royalties thereon.

BACKGROUND AND SUMMARY OF THE INVENTION

Chemical projectiles often include a payload consisting of a liquid fill, for example, nerve agent, mustard, or white phosphorous. After long term storage, these fills may undergo a chemical or physical change in their physical properties such as density, viscosity, etc. which can affect their performance, functioning and military potential.

The instant invention is a method by which the condition of the liquid fill in a projectile can be assessed without requiring cutting, drilling, and/or altering the structure of the shell or payload. This non-destructive technique can be used with projectiles filled with toxic or hazardous materials and can occur within the confines of storage buildings.

It is an object of this invention, therefore, to provide a system for ascertaining the condition of the liquid fill in a projectile.

Another object of this invention is to provide a system which determines the condition of the liquid fill in a projectile without requiring alteration of the shell structure or payload.

It is another object of this invention to provide a system for liquid fill assessment of a projectile which can take place within the projectile storage area without requiring the projectile to be removed from the storage building.

Further objects and advantages of this invention will become more apparent in light of the following drawings and description of the preferred embodiment of the invention.

BRIEF DESCRIPTION OF THE DRAWINGS

FIG. 2 is a perspective view in three dimensions of graphs of a typical test liquid fill indicating the relationship between wave amplitude, frequency, damping, viscosity and time for the invention.

DESCRIPTION OF THE PREFERRED EMBODIMENTS OF THE INVENTION

Figure 1:
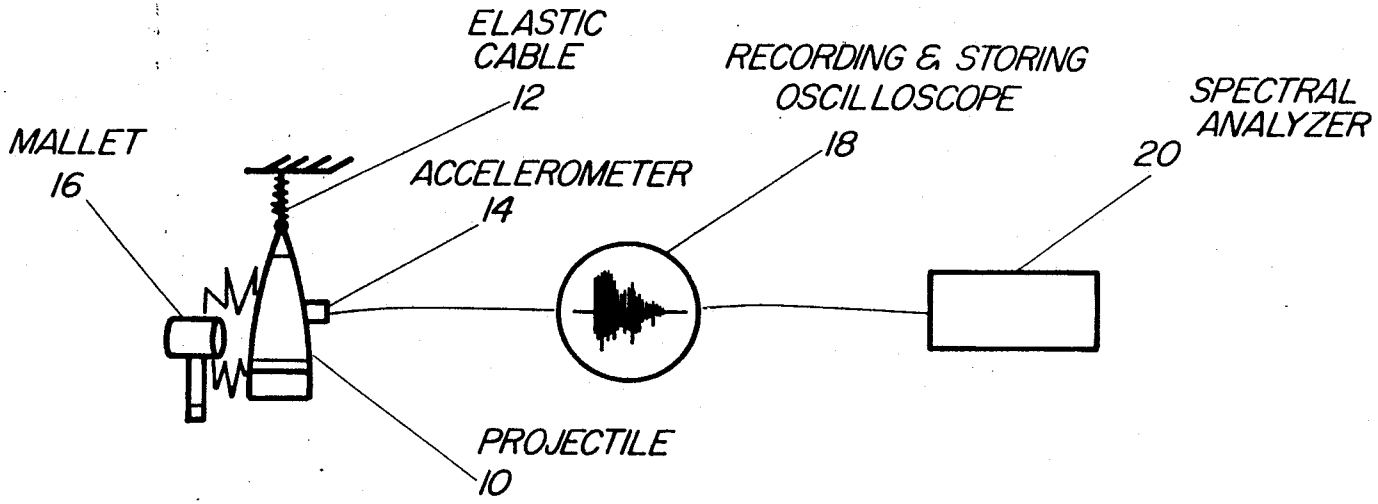
FIG. 1 is a view of an embodiment of a system incorporating a method for assessment of the condition of liquid fill in a projectile without alteration of the shell structure or payload.

Referring to FIGS. 1 and 2 of the drawings, there is a testing system shown embodying the principles of this invention. The embodiment of the invention is based on measuring the frequency and damping characteristics of a projectile 10 and liquid fill (not shown) at their natural vibrational response conditions.

The test item and associated instrumentation are illustrated in FIG. 1. An actual projectile 10 is suspended in the air by an elastic cable 12 so that the projectile 10 is free to vibrate. An accelerometer 14 is placed on the outside surface of the projectile 10, either on the base or side.

The projectile 10 is then struck with a mallet 16 or other heavy object to cause the projectile 10 and liquid fill (not shown) to vibrate at their natural frequencies. The accelerometer 14 and recording and storage oscilloscope 18 will detect and record the amplitude and frequency of the projectile and fill motion resulting from this impact as a function of time.

A multitude of vibration frequencies will be observed which include responses from all the excited parts including the projectile casing components and fill. This data is then input into a spectral analyzer 20 which produces a plot of the amplitude as a function of frequency and time as depicted in FIG. 2 allowing each of the vibrational elements, including the liquid fill, to be isolated and their respective contributions evaluated.

The density of the liquid fill will influence the frequency 21 and the viscosity of the liquid fill will influence the amplitude decay 22 with time (i.e., damping) of the signals obtained. This data can be compared to a standard reference projectile 10 and liquid fill or can be based on previous calibrations using a series of projectiles and various fills having different densities and viscosities.

An extension of this free vibration method would be to employ a forced vibration method, but this might act to alter the fluid properties. The frequency 21 and amplitude decay (damping) 22 represent two different and independent parameters which could provide a unique signature to differentiate between the relative density and viscosity of the liquid fills.

The apparatus can be used in the confines of the storage area and does not require destruction of the projectile 10 or involve a hazardous operation.

This method is independent of whether the liquid fill is homogeneous or has a non-homogeneous or stratified composition and is unaffected by the presence of baffles or other non-rigid or rigid elements within the projectile. Thus, this invention provides for assessment of the liquid fill in the presence of configurations intended to improve the munition effectiveness or disguise the presence of its liquid fill in a manner which would prevent determination by other techniques.

Accordingly, modifications and variations to which the invention is susceptible may be practiced without departing from the scope and intent of the appended claims.

What is claimed is:

1. A method for noninvasively assessing the condition of liquid fill within a sealed projectile by measuring the frequency and damping characteristics of the said fill through its natural vibrational response conditions upon excitation, comprising the steps of:

suspending said projectile from an elastic cable means;

striking said projectile with an object to cause vibration;

measuring the vibrational pattern of said projectile, which vibration includes a composite of both fill vibration and projeetile vibrations at their respective natural frequencies; and analyzing said responses to determine a change in fill vibrational response against known standards, to determine present condition of said fill thereby.

2. The method of claim 1 wherein the said measuring step comprises attaching an accelerometer means to the body of said projectile, which accelerometer means transduces mechanical projectile vibrations into electrical signals, feeding said accelerometer's electrical signals into an oscilloscope and spectral analyzer arrangement, whereby vibrations of said projectile and fill may be thereby analyzed.

3. The method of claim 2 wherein said object for striking the projectile is a hand mallet.

* * * * *